United States Patent [19]

Kobori et al.

[11] 4,289,389
[45] Sep. 15, 1981

[54] EXPOSURE CONTROL DEVICE FOR A CAMERA

[75] Inventors: Toshio Kobori, Sakai; Masayoshi Sahara, Sennan, both of Japan

[73] Assignee: Minolta Camera Kabushiki Kaisha, Azuchi, Japan

[21] Appl. No.: 106,098

[22] Filed: Dec. 21, 1979

Related U.S. Application Data

[63] Continuation of Ser. No. 942,830, Sep. 12, 1978, abandoned.

[30] Foreign Application Priority Data

Sep. 13, 1977 [JP] Japan .................................. 52-110780

[51] Int. Cl.³ ............................................. G03B 7/083
[52] U.S. Cl. ...................................... 354/31; 354/51;
354/60 R
[58] Field of Search .................... 354/31, 50, 51, 60 R

[56] References Cited

U.S. PATENT DOCUMENTS 3,973,266 8/1976 Kakunodate et al. ................. 354/31

Primary Examiner—L. T. Hix
Assistant Examiner—W. J. Brady
Attorney, Agent, or Firm—Watson, Cole, Grindle & Watson

[57] ABSTRACT

A camera exposure control device having TTL light measuring circuitry capable of spot metering and also averaged metering is disclosed, the spot metering being used for measurement with the camera directed to a main object prior to the camera release operation, and the averaged metering being used for measurement with the camera positioned for making a desired composition including the main object. The difference between the logarithm of the spot metering output and that of the averaged metering output with the aperture at its initial size is stored prior to the aperture stopping-down motion. Exposure is actually controlled by the averaged metering output, which is obtained after the initiation of the aperture stopping-down motion in response to camera release operation with the stored difference between the aforementioned outputs added thereto, to thereby effectively achieve an exposure control equivalent to a control based on a spot metering output which would be obtained after the initiation of the aperture stopping-down motion.

2 Claims, 2 Drawing Figures

EXPOSURE CONTROL DEVICE FOR A CAMERA

This is a continuation of application Ser. No. 942,830 filed Sept. 12, 1978, now abandoned.

BACKGROUND OF THE INVENTION

1. Field of the Invention

The present invention generally relates to an exposure control device for a camera, and more particularly to an exposure control device for a camera capable of controlling camera exposure by means of light measuring output obtained and stored prior to an actual exposure. Such an exposure control is necessitated in case that an optimum exposure control is desired with respect to a main object located at a particular point within an area to be photographed, e.g., at a corner of the rectangular scene area to be photographed.

2. Description of the Prior Art

In case that, for example, one desires to photograph a composition with the main object located at a corner of the rectangular scene area to be photographed, exposure control is not generally optimum with respect to the main object since an automatic exposure control camera is so designed to control exposure in response to an averaging or a center-weighted light metering output determined subsequent to the camera release operation with respect to the whole area to be photographed.

For the purpose of achieving an optimum exposure control with respect to the main object as in the above case, prior art cameras are provided with a manually operable switch for storing a light measuring output prior to the camera release operation. This is disclosed, for example, in U.S. Pat. No. 3,756,131. The method of photography using such a camera comprises: a first step to operate the manually operable switch with the camera close to the main object so that substantially the whole acceptance angle effective for light measuring may be occupied by the main object, and the value of the stored light measuring output may thereby be determined with respect to the main object only; and a second step where the camera is returned to a position for making the desired composition and the camera release operation is actually carried out so that the exposure control may be determined by the stored light measuring output.

The above method, however, is only possible in case of a camera which is designed to control exposure in response to a TTL light measuring output obtained with the aperture at its initial aperture size, e.g., a fully open aperture size.

Moreover, there is a camera of the type in which the exposure is controlled by a TTL light measuring output obtained after the initiation of the aperture stopping-down motion from its fully open aperture size. In this type of camera, the above mentioned method is not applicable since any reliable light measuring output is not obtainable until the aperture stopping-down motion actually begins subsequent to the actual camera release operation, thereby making the above mentioned first step impossible.

SUMMARY OF THE INVENTION

An object of the present invention is to provide a camera of a type, in which the exposure is controlled by a TTL light measuring output obtained after the initiation of aperture stopping-down motion subsequent to the actual camera release operation, with a means for enabling an optimum exposure control with respect to a main object located at a particular point within a scene area to be photographed.

The present invention is characterized in that the exposure is controlled by a light measuring output obtainable after the initiation of the aperture stopping-down motion subsequent to the actual camera release operation combined with a light measuring output stored prior to the actual camera release operation with the effective light measuring acceptance angle substantially occupied by the main object.

Specifically, according to an embodiment of the present invention, a light measuring output with the effective light measuring acceptance angle substantially occupied by the main object is first stored prior to the actual camera release operation. The camera is then positioned to make a desired composition, in which the main object is located in a small portion of the effective light measuring acceptance angle, and the camera release operation is actually performed. Upon camera release operation, the difference between the logarithm of the stored light measuring output and that of a light measuring output with the camera positioned to make a desired composition is stored prior to the initiation of aperture stopping-down motion, and the aperture stopping-down motion follows thereafter. Exposure is controlled in accordance with the logarithm of a light measuring output, which is obtained after the initiation of the aperture stopping-down motion, with the stored logarithmic difference added thereto to make the exposure control optimum with respect to the main object. The reason why the exposure is optimum with respect to the main object is that the logarithmic difference with the aperture at its initial size is equal to the logarithmic difference with the aperture stopped-down to any size. Thus, by means of the addition of the logarithmic difference stored with the aperture at its initial size, the light measuring output obtained after the aperture stopping-down motion with the light measuring acceptance angle not occupied by the main object is successfully converted into a light measuring output that would be obtained with the effective light measuring acceptance angle occupied by the main object.

Further, according to the invention, it is recommended that a spot metering device, in addition to an averaging metering device, is utilized for the purpose of obtaining the light measuring output to be stored prior to the camera release operation. The spot metering device may make it unnecessary for the camera to be close to the main object for storing the light measuring output, since the narrow light measuring acceptance angle of the spot metering device can easily be occupied by the main object if the camera is caused to slightly deviate from the composition making position, in which, for example, the main object is at the corner of the object field, so as to be directly aimed at the main object.

DETAILED DESCRIPTION OF THE PREFERRED EMBODIMENTS

Figure 1:
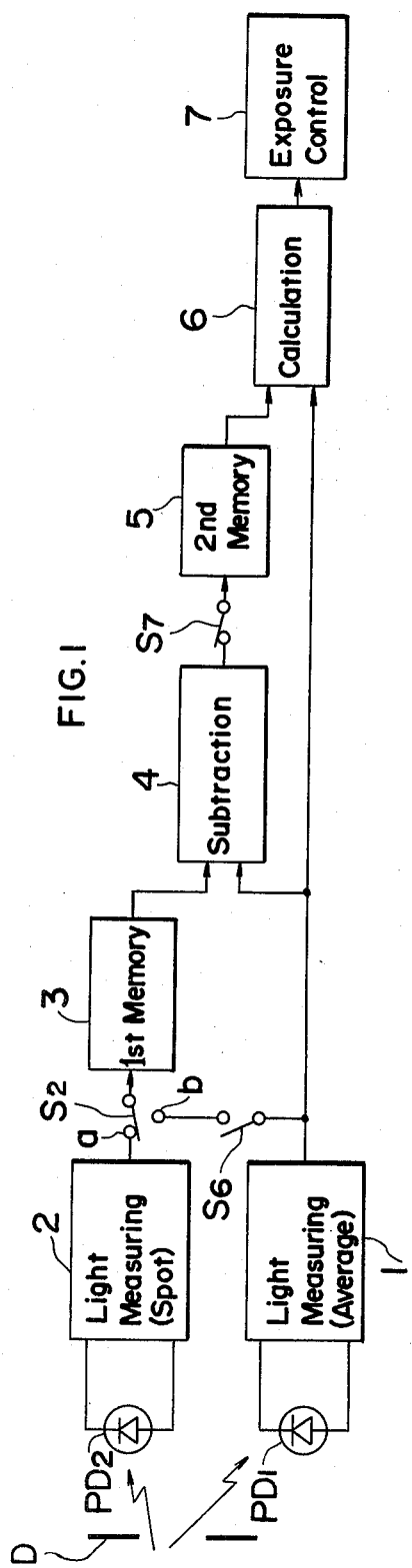
FIG. 1 represents a block diagram of an embodiment of the exposure control device according to the present invention.

Referring to FIG. 1, which shows a block diagram of a first preferred embodiment according to the present invention, light measuring circuit 1 is designed for averaged light measuring, with photodiode PD1 disposed in a position where it obtains an output in response to the averaged scene brightness of a field to be photographed. Light measuring circuit 2 is provided for spot light measuring, with photodiode PD2 disposed in a position where it obtains an output in response to the brightness of a comparatively small given section of a field to be photographed, e.g. the central section of the field to be photographed. Light measuring circuits 1 and 2 produce voltage signals proportional to the logarithm of the brightness of scene light incident respectively on photodiodes PD1 and PD2 through diaphragm aperture D. First memory circuit 3 stores the output produced by light measuring circuit 2 for spot light measuring. Switch S2 is manually operated and usually connected to contact b and changes to contact a, while a button provided on the camera body is kept depressed when photographing by spot light measuring. Switch S6 is also manually operated for changing photography modes, and it is closed for photographing by averaged light measuring and is opened for photographing by spot light measuring. FIG. 1 shows that switch S6 is opened for photographing by spot light measuring.

With the above mentioned construction, the camera is first held so that a main object for spot light measuring is in the spot light measuring range, and switch S2 is changed to contact a. This causes the result of spot light measuring to be stored in first memory circuit 3 as an input, and is retained therein even when switch S2 is thereafter returned to its original position at contact b (since switch S6 is opened). Then, with the camera held for making a desired composition in which the main object is at a particular location deviating from the spot light measuring range and the shutter release button depressed, the outputs of light measuring circuit 1 and first memory circuit 3 immediately before diaphragm aperture D is stopped-down from its fully open aperture size, are applied to subtraction circuit 4, the subtraction result or a difference between the outputs is stored in second memory circuit 5. The signal stored in second memory circuit 5 can be written as the following formula, assuming that the output of averaged light measuring circuit 1 for a fully open aperture is Vao, and that the output of spot light measuring circuit 2 for a similarly open aperture is Vso:

$$Vso - Vao$$

Switch S7 is opened during the shutter button depression operation immediately before diaphragm aperture D is stopped-down to thereby fix the signal storage in second memory circuit 5. With the aperture D stopped-down afterward, output Va of averaged light measuring circuit 1 when the aperture was stopped-down, and a stored signal in second memory circuit 5, are input into calculation circuit 6. Calculation circuit 6 performs a calculation formulated as follows:

$$Va + (Vso - Vao)$$

The above value corresponds to the spot light measuring output with the aperture stopped-down. Exposure control circuit 7 carries out exposure control in response to an output from the above mentioned calculation circuit 6.

For normal photographing by averaged light measuring, switch S6 is kept closed. Switch S2 remains connected to contact b since it is not operated. This means that the two inputs to subtraction circuit 4 are both from light measuring circuit 1 to make the subtraction result zero. The zero subtraction result of subtraction circuit 4 is also stored as a storage signal in second memory circuit 5. Therefore, the input to calculation circuit 6 is only output Va of averaged light measuring circuit 1 produced when diaphragm aperture D is stopped-down, and output Va is input to exposure control circuit 7 for exposure control by averaged light measuring.

The first preferred embodiment shown in FIG. 1 is applicable to a variety of automatic exposure control modes, as described below.

For automatic exposure time control with a preset aperture, calculation circuit 6 receives from light measuring circuit 1 averaged light measuring output Va when diaphragm aperture D is stopped-down to a preset position, and exposure control circuit 7 provides a shutter speed appropriate to spot light measuring made for the preset aperture. With the assumption that averaged light measuring output Va for a fully open aperture is an exposure time of 1/500 second, and spot light measuring output Vso is an exposure of 1/2000 second, the difference in shutter speed between the two exposure times is two steps, and this difference is the output of second memory circuit 5. And when averaged light measuring output Va with diaphragm aperture D stopped-down to the preset position corresponds to 1/125 second, calculation circuit 6 produces an output corresponding to 1/500 second with two steps added to the averaged light measuring output Va.

The following is an explanation of an automatic aperture control mode with a predetermined exposure time using the above example. The output of 1/500 second of light measuring circuit 1 is for a fully open aperture, and this means that diaphragm aperture D should be stopped-down by two steps if the preset shutter speed is 1/125 second. The output of second memory circuit 5 is a signal for diaphragm aperture D to be stopped-down by an additional two steps, and therefore calculation circuit 6 produces an output for the aperture to be stopped-down by four steps from the fully open aperture. In response to the output from calculation circuit 6, exposure control circuit 7 operates to stop-down diaphragm aperture D by four steps from the fully open aperture. It should be understood that in this mode second memory circuit 5 may be omitted.

For automatic aperture control with a predetermined exposure time, there is another mechanism available in which an aperture stopping-down motion toward the minimum aperture is interrupted when the TTL light measuring output obtained during the aperture stopping-down motion is in a predetermined relation with the preset shutter speed. In this case, however, while the difference in output between averaged light measuring and spot light measuring for a fully open aperture is input to calculation circuit 6 from second memory circuit 5, an averaged light measuring output during the time that the aperture is stopped-down is transmitted to calculation circuit 6 from light measuring circuit 1. With the aforesaid example of light measuring output, the light measuring output during the aperture stopping-down motion is produced from calculation circuit 6, with the difference of the two steps added, and this output is compared with a signal in response to a preset shutter speed by exposure control circuit 7. The aperture stopping-down motion is interrupted at a position where the aforesaid output and signal are equal to determine an optimum aperture size.

Figure 2:
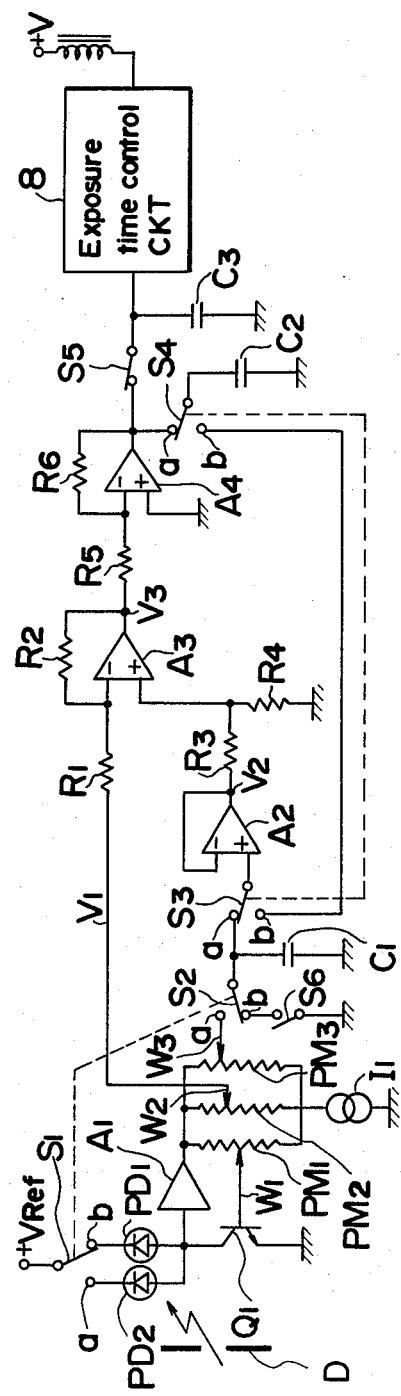
FIG. 2 represents a schematic circuit diagram of another embodiment of the exposure control device according to the present invention.

In the embodiment shown in FIG. 2, a common light measuring circuit is used both for averaged light measuring and spot light measuring, with photodiodes PD1 and PD2 arranged to be individually connected to a reference voltage VRef. Photodiode PD1 is used for averaged light measuring and photodiode PD2 for spot light measuring. Switch S1 is usually connected to contact b, and is connected to contact a only when a special button provided on the camera body remains depressed. Therefore, switch S1 is usually set for averaged light measuring. Transistor Q1 converts the output current of photodiode PD1 or PD2 to a logarithmically compressed voltage signal. High input impedance buffer amplifier A1 receives the output of either photodiode PD1 or PD2 and potentiometer PM1 is used to set the film sensitivity. The output of high input impedance buffer amplifier A1 is the summation of the scene brightness and the film sensitivity in accordance with the APEX notation system. Potentiometers PM2 and PM3 are used to make the averaged light measuring output and spot light measuring output equivalent. The output of high input impedance buffer amplifier A1 is generally expected to be the same for an object field having uniform brightness when either photodiode PD1 or PD2 is used. In fact, however, photodiode PD1 is positioned to optimize averaged light measuring, and photodiode PD2 is positioned to optimize spot light measuring, with their respective outputs being unequal even in the above case. This causes the output of high input impedance buffer amplifier A1 to vary in accordance with the output of either photodiode PD1 or PD2. Potentiometers PM2 and PM3 are adjusted and fixed upon assembling the camera so that both light measuring outputs in the above case become equal, thereby making the two outputs equivalent. Switch S2, interlocked with switch S1, is usually connected to contact b and disconnected from slider W3 of potentiometer PM3. Slider W2 of potentiometer PM2 is always connected to operational amplifier A3. Constant-current circuit I1 supplies constant current to potentiometers PM1, PM2 and PM3.

The following description of the circuitry shown in FIG. 2 is made with photography by spot light measuring. Switches S1 and S2 are first depressed to change their respective connection to contact a. This allows photodiode PD2 to operate for spot light measuring with a fully open aperture, and spot light measuring result Vso is stored in capacitor C1 from slider W3 of potentiometer PM3 via switch S2. In this photographing mode, manual switch S6 is opened beforehand. Furthermore, switches S3 and S4, interlocked with each other, are connected to their respective contacts a, as shown in the diagram. With switches S1 and S2 then released to return to their original positions at their respective contacts b, averaged light measuring with a fully open aperture is performed by photodiode PD1, with averaged light measuring output Vao appearing at slider W2 of potentiometer PM2. Output Vao is applied as a subtrahend to a subtraction circuit corresponding to subtraction circuit 4 of FIG. 1, consisting of resistors R1 through R4 and operational amplifier A3. The minuend of the subtraction circuit is spot light measuring output Vso with a fully open aperture, which output is stored in capacitor C1 and applied to the subtraction circuit through operational amplifier A2 designed for impedance conversion. The output of the subtraction circuit is Vso−Vao, which output is inverted by an inversion circuit, including operational amplifier A4 and resistors R5 and R6 (of equal resistance), into a signal Vao−Vso which is charged and stored in capacitor C2. With the shutter button depressed, switches S3 and S4 are changed to their respective contacts b immediately before diaphragm aperture D is stopped-down, and capacitor C2 retains output Vao−Vso which is again applied via operational amplifier A2 to the plus terminal of operational amplifier A3 as a minuend to the subtraction circuit. Averaged light measuring output Va, when diaphragm aperture D is stopped-down to a preset position, is then produced from slider W2 of potentiometer PM2 and is applied to the minus terminal of operational amplifier A3 as a subtrahend to the subtraction circuit. Therefore, the output of operational amplifier A3 at this time is (Vao−Vso)−Va which is inverted by the inversion circuit including operational amplifier A4 to become Va−(Vao−Vso) which is charged and stored in capacitor C3. Switch S5 is opened immediately before the swingable mirror of an SLR camera moves, and the aforesaid output at that time is retained by capacitor C3. Exposure time control circuit 8 operates in accordance with the voltage stored in capacitor C3 to close the shutter with a delay, which is an optimum exposure time for the main object with spot light measuring, from the instant of shutter opening.

The following description is with respect to normal photography using averaged light measuring. In this mode, switch S6 remains closed, and switches S3 and S4 are at their respective contacts a. Since switch S6 is closed, the charge at capacitor C1 is zero and the input (minuend) at the plus terminal of operational amplifier A3 in the subtraction circuit is also zero. Switches S1 and S2 are not operated, remaining connected to contact b. An averaged light measuring output is produced from slider W2 of potentiometer PM2 and is applied to the minus terminal of operational amplifier A3 in the subtraction circuit as a subtrahend, and because the minuend is only zero, the averaged light measuring output is inverted and applied to operational amplifier A4 of the inversion circuit, and is inverted again to return to its original form and charged on capacitor C3. The output charged on capacitor C3 varies during aperture stopping-down motion from the initial fully open aperture to the final preset aperture. However, an averaged light measuring output with the diaphragm aperture D stopped-down to the preset position is retained by capacitor C3 by means of opening of switch S5 immediately before the mirror-up motion and in response to that stored output of capacitor C3 exposure time is controlled. It is to be noted that in this mode the output of slider W2 may be directly input to and stored by capacitor C3 without passing through operational amplifiers A3 and A4.

In the embodiment disclosed in FIG. 1, a modification is possible in which light measuring circuit 2 for spot metering is removed from the device. In this case, it is apparent that a photographer has to approach close to the main object for storing the light measuring output so that the light measuring acceptance angle of the photodiode PD1 may be occupied by the main object and first memory circuit 3 may receive a light measuring output with respect to the main object only as in the case of receiving output from light measuring circuit 2. In the above modification, switch S6 has to be modified to be constantly closed and switch S2, which normally contacts contact b and is opened to fix the contents of first memory circuit 3, has to be kept open until switch S7 is opened. The other operations are the same as those already disclosed.

What is claimed is:

1. Exposure control device for a camera comprising:
   a diaphragm aperture capable of being varied from an initial aperture size subsequent to the camera release operation;
   means for measuring light through the diaphragm aperture to produce a first light measuring output;
   first means for optionally storing said first light measuring output prior to the camera release operation; and
   means for controlling the camera exposure based on a combination of a first light measuring output stored by said first storing means, a second light measuring output obtainable from said light measuring means within a period defined between the camera release operation and the initiation of the variation of the diaphragm aperture, and a third light measuring output obtainable from the light measuring means after the initiation of the variation of the diaphragm aperture, and said controlling means includes second means for storing the difference between the first and second light measuring outputs, and means for calculating the third light measuring output with the difference stored by said second storing means.

2. Exposure control device as in claim 1, wherein the light measuring means comprises a first light measuring device capable of averaged metering to produce said second and third light measuring outputs, and a second light measuring device capable of spot metering to produce said first light measuring output.

* * * * *